US010823285B2

(12) United States Patent
Winkel et al.

(10) Patent No.: US 10,823,285 B2
(45) Date of Patent: Nov. 3, 2020

(54) OVERPRESSURE PREVENTION SYSTEM FOR AN AGRICULTURAL MACHINE

(71) Applicant: CNH Industrial America LLC, New Holland, PA (US)

(72) Inventors: Steven N. Winkel, Kiel, WI (US); Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 678 days.

(21) Appl. No.: 15/481,796

(22) Filed: Apr. 7, 2017

(65) Prior Publication Data

US 2018/0288932 A1    Oct. 11, 2018

(51) Int. Cl.
*B60H 1/24* (2006.01)
*F16H 61/4157* (2010.01)

(52) U.S. Cl.
CPC ............... *F16H 61/4157* (2013.01)

(58) Field of Classification Search
CPC  B60H 1/00849; B60H 1/00735; B60H 1/247; B60H 2001/3248; B60H 1/32
USPC ................................. 454/69–165
See application file for complete search history.

(56) References Cited

U.S. PATENT DOCUMENTS

| | | |
|---|---|---|
| 2,549,673 A | 4/1951 | Del Mar |
| 2,601,745 A | 7/1952 | Cruzan |
| 2,830,521 A | 4/1958 | Fischer et al. |
| 3,472,147 A | 10/1969 | Grasseler |
| 5,503,178 A | 4/1996 | Miskelley et al. |
| 5,695,397 A | 12/1997 | Frank et al. |
| 6,196,468 B1 * | 3/2001 | Young ............... G05D 23/1909 165/237 |
| 6,945,278 B2 | 9/2005 | Bunn et al. |
| 8,616,944 B2 | 12/2013 | Chambo et al. |
| 9,366,348 B2 | 6/2016 | Kiezulas et al. |

(Continued)

FOREIGN PATENT DOCUMENTS

EP    2527172 A1    11/2012

OTHER PUBLICATIONS

Type G3EGLP Relief Valve; Instruction Manual D450319T012; Emerson Process Management/Fisher; Sep. 2016; Retrieved on Mar. 14, 2017 from web-site: http://www.emerson.com/resource/blob/123214/; pp. 1-16; US.

(Continued)

*Primary Examiner* — Vivek K Shirsat
*Assistant Examiner* — Ko-Wei Lin
(74) *Attorney, Agent, or Firm* — Rebecca L. Henkel; Rickard K. DeMille

(57) ABSTRACT

Agricultural machines such as sprayers can be improved by providing a pressure relief system in the operator cab to allow the operator cab to be pressurized while avoiding over-pressurization. The pressure relief system can be arranged to allow air to freely escape from the operator cab during what would otherwise be an over-pressurization event, such as a door or window being closed. In one aspect, the pressure relief system can include a spring-loaded pressure relief valve configured to passively allow air to escape from the cab in order to maintain a cab pressure at or below a predetermined threshold, such as 100 Pascals. In addition, interior and exterior pressures can be monitored for implementing a closed loop control for the pressurization system to enable a more comfortable experience for the operator.

3 Claims, 7 Drawing Sheets

(56) References Cited

U.S. PATENT DOCUMENTS

| | | | |
|---|---|---|---|
| 2004/0092223 A1* | 5/2004 | Doescher | B60H 1/00378 454/70 |
| 2009/0120517 A1 | 5/2009 | Whitney | |
| 2010/0216384 A1 | 8/2010 | McCarthy et al. | |
| 2014/0273786 A1* | 9/2014 | Wade | B60H 1/00828 454/75 |

OTHER PUBLICATIONS

Type 63EGLP Relief Valve; Instruction Manual D4503191012; Emerson Process Managaement/Fisher; Sep. 2016; Retrieved on Mar. 14, 2017 from web-site: http://www.emerson.com/resource/blob/123214/; pp. 1-16; US.

* cited by examiner

OVERPRESSURE PREVENTION SYSTEM FOR AN AGRICULTURAL MACHINE

FIELD OF THE INVENTION

The invention relates generally to agricultural product application equipment such as self-propelled sprayers and, in particular, to an overpressure prevention system for agricultural machines in which a pressure relief system including a pressure relief valve actuated by a spring is arranged in an operator cab to release pressure from the operator cab when pressurization of the operator cab exceeds a threshold.

BACKGROUND OF THE INVENTION

High-clearance sprayers are getting larger and more complex to allow for increasing coverage in a single pass. Such sprayers oftentimes include operator comfort improvements like Heating, Ventilation and Air Conditioning (HVAC) systems to reduce operator stress and fatigue during long application sessions. Such HVAC systems can be designed to draw ambient air external to the operator cab, filter dust and/or other airborne materials from such air, and provide the air to the operator cab. However, in some situations, pressurization of the operator cab by the HVAC system can cause momentary cab pressure spikes. For example, when a door or window is opened, pressurization can quickly equalize with the outside environment. However, when the door or window is closed, the HVAC system can pressurize the operator cab quickly, thereby causing a sudden pressure spike that can be uncomfortable for the operator. A need therefore exists for an improved system which eliminates one or more of the foregoing disadvantages.

SUMMARY OF THE INVENTION

Agricultural machines such as sprayers can be improved by providing a pressure relief system in the operator cab to allow the operator cab to be pressurized while avoiding over-pressurization. The pressure relief system can be arranged to allow air to freely escape from the operator cab during what would otherwise be an over-pressurization event, such as a door or window being closed. In one aspect, the pressure relief system can include a spring-loaded pressure relief valve configured to passively allow air to escape from the cab in order to maintain a cab pressure at or below a predetermined threshold, such as 100 Pascals. In addition, interior and exterior pressures can be monitored for implementing a closed loop control for the pressurization system to enable a more comfortable experience for the operator.

Moreover, a cab sensor for sensing an open or closed state of the operator cab, such as with respect to the door or window, and a controller configured to activate/deactivate an airflow system according to the interior and exterior pressures and the cab sensor, can further improve the system. In one aspect, the controller can activate the airflow system to provide a positive pressure differential in the operator cab (higher pressure in the operator cab/lower pressure external to the operator cab) and release excess pressure from the operator cab, when the cab is in the closed state, and deactivate the airflow system when the cab is in the open state, to thereby maximize the life of the system and comfort for the operator.

Specifically then, one aspect of the present invention can provide a pressurization system for an agricultural machine including: an operator cab having a door or window; an airflow system configured to draw ambient air into the operator cab to cause pressurization of the operator cab; and a pressure relief system arranged in the operator cab. The pressure relief system can include a pressure relief valve actuated by a spring. The pressure relief system can be configured to release pressure from the operator cab when the pressurization of the operator cab exceeds a threshold.

Another aspect can provide a method for pressurizing an operator cab of an agricultural machine having a door or window, the method including: drawing ambient air into the operator cab with an airflow system to cause pressurization of the operator cab; and using a pressure relief system arranged in the operator cab to release pressure from the operator cab when the pressurization of the operator cab exceeds a threshold. The pressure relief system can include a pressure relief valve actuated by a spring.

Another aspect can provide an agricultural sprayer including: a chassis supported by multiple wheels, the chassis supporting an engine, a drive system, a lift arm assembly and an operator cab having a door or window; a sprayer boom connected to the lift arm assembly; an airflow system configured to draw ambient air into the operator cab to cause pressurization of the operator cab; a pressure relief system arranged in the operator cab, the pressure relief system including a pressure relief valve actuated by a spring, the pressure relief system being configured to release pressure from the operator cab when the pressurization of the operator cab exceeds a threshold; a first pressure sensor configured to sense a first pressure in the operator cab; a second pressure sensor configured to sense a second pressure external to the operator cab; a cab sensor configured to sense an open or closed state of the door or window; and a controller in communication with the airflow system, the first and second pressure sensors and the cab sensor. The controller can execute a program stored in a non-transient medium operable to: (a) determine a pressure differential by calculating a difference between the first and second pressures, in which the pressure differential is positive when the first pressure is greater than the second pressure; (b) activate the airflow system to provide a positive pressure differential when the cab sensor indicates the door or window is in the closed state; and (c) deactivate the airflow system when the cab sensor indicates the door or window is in the open state.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
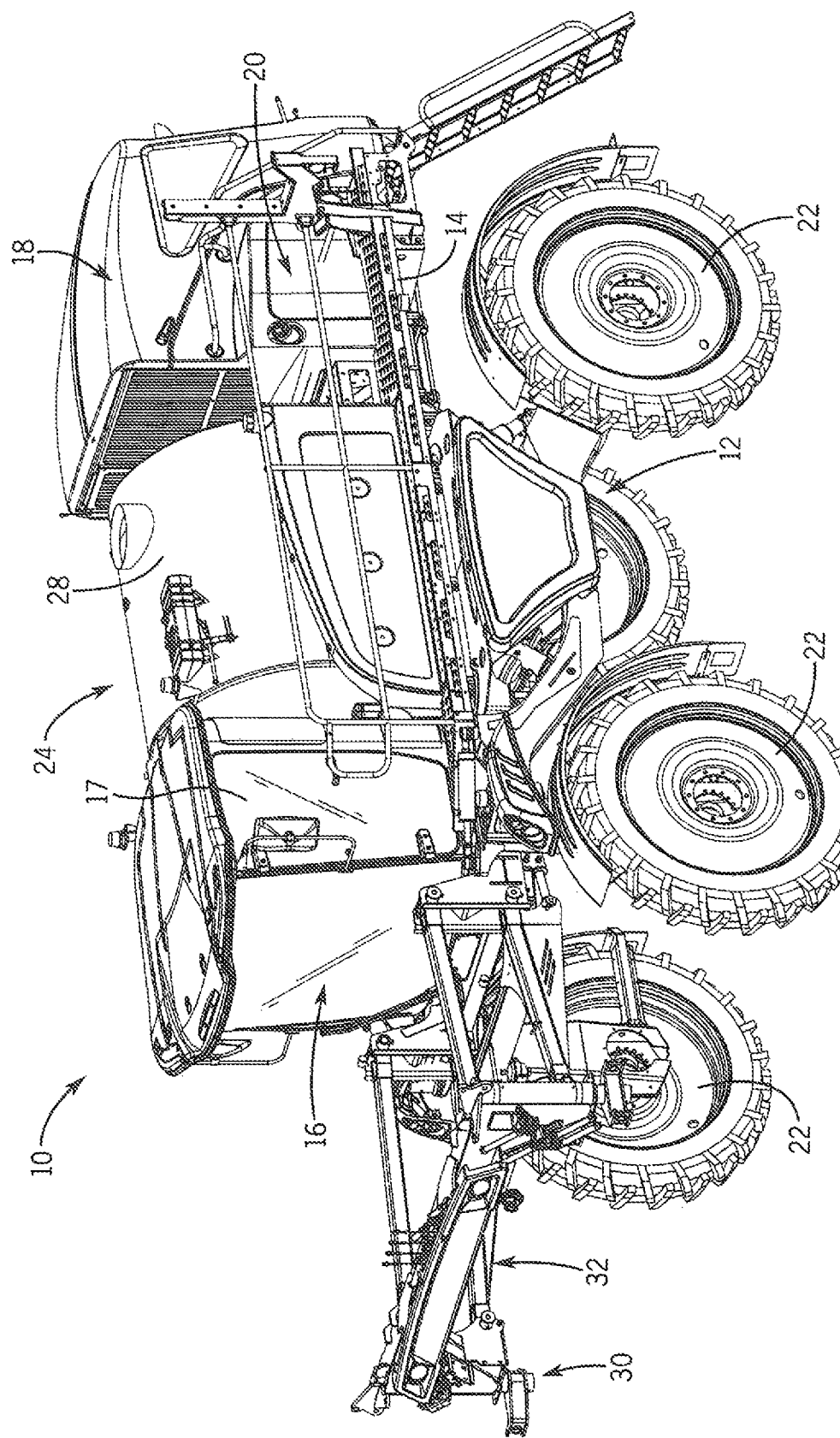
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16 having a cab door 17 or window, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
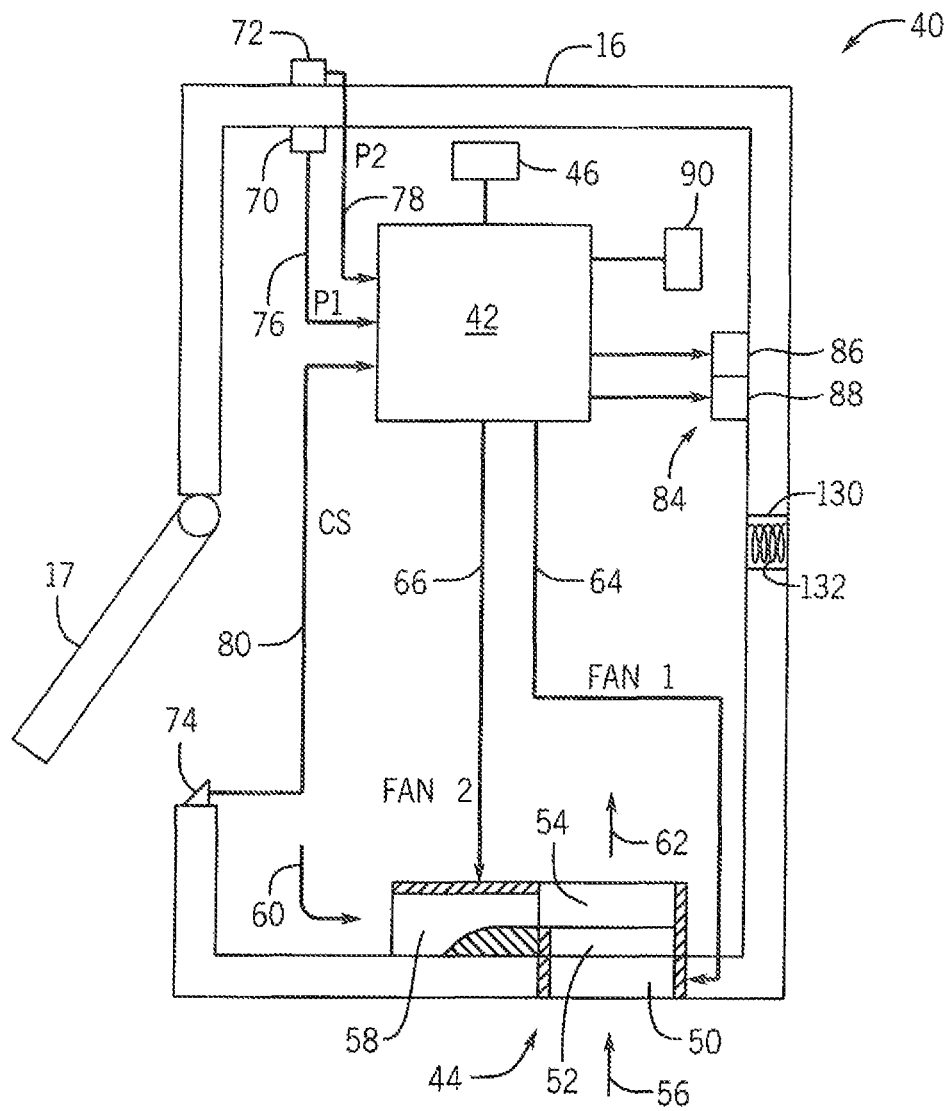
FIG. 2 is block diagram of a pressurization system implemented with respect to an operator cab of the machine of FIG. 1 in which a door or window of the operator cab is in an open state

Referring now to FIG. 2, a block diagram of a pressurization system 40 which may be implemented with respect to the operator cab 16 of the sprayer 10 is provided in accordance with an aspect of the invention. The pressurization system 40 can include a controller 42 in communication with an airflow system 44 and multiple sensors as will be described. The controller 42 can be a microprocessor, a microcontroller or other programmable logic element configured to execute a program stored in a non-transient medium 46 as known the art. The controller 42 can be in communication with the airflow system 44 for controlling operation of airflow with respect to the operator cab 16. In one aspect, the airflow system 44 can include a first fan 50 configured to draw ambient air through an air filter 52, so as to remove dust and/or other airborne materials from such air, into a mixing chamber 54 in a first air stream 56. The airflow system 44 can also include a second fan 58 configured to draw air from the operator cab 16 into the mixing chamber 54 in a second air stream 60. The first and second air streams 56 and 60, respectively, can then mix in the mixing chamber 54 and release into the operator cab 16 in a third air stream 62. The controller 42 can control activation, variable speed and/or deactivation of the first and second fans 50 and 58, respectively, via first and second fan control signals 64 and 66, respectively (labelled "FAN1" and "FAN2").

In addition, the controller 42 can be in communication with first and second pressure sensors 70 and 72, respectively, and one or more cab sensors 74. The first pressure sensor 70 can be configured to sense a first pressure in the operator cab 16, and indicate that first pressure to the controller 42 via a first pressure signal 76 (labelled "P1"). The second pressure sensor 72 can be configured to sense a second pressure external to the operator cab 16, and indicate that second pressure to the controller 42 via a second pressure signal 78 (labelled "P2"). Each cab sensor 74 can be configured to sense an open or closed state of the operator cab 16, and indicate that open or closed state to the controller 42 via a cab sensor signal 80 (labelled "CS"). Multiple cab sensors 74 can be used for each door, window or other opening from the operator cab 16 to the external environment. When a door, window or other opening is opened, a corresponding cab sensor 74 can sense the open position and indicate an "open state" to the controller 42. Conversely, when the door, window or other opening is closed, the corresponding cab sensor 74 can sense the closed position and indicate a "closed state" to the controller 42. Cab sensors 74 can be implemented, for example, as door switches, such as a door switch variety as shown with respect to door 17 in FIG. 2 by way of example, or as other detection elements known in the art.

The controller 42 can also be in communication with an alarm system 84 and a timing system 90. The controller 42 can activate one or more aspects of the alarm system 84 to warn the operator of various conditions as will be described, such as illumination of a visual indicator 86, which could be an Light Emitting Diode (LED) and/or text displayed to a Human Machine Interface (HMI) or other screen, and/or an audible indicator 88, which could be a speaker for emitting a warning sound or stating a warning message. The controller 42 can also utilize the timing system 90 for timing various conditions as will be described for monitoring and/or reporting.

The pressurization system 40 can further include one or more pressure relief systems 130 arranged in the operator cab 16. In a preferred aspect, the pressure relief system 130 can include a pressure relief valve actuated by a spring 132. The pressure relief system can be configured to release pressure from the operator cab 16 when pressurization of the operator cab 16 exceeds a threshold, such as 100 Pascals. As shown in FIG. 2, the door 17 of the operator cab 16 is in an open state, thereby equalizing pressure interior to the operator cab 16 with ambient pressure exterior to the operator cab 16. Consequently, the pressure relief system 130 is closed.

Figure 3:
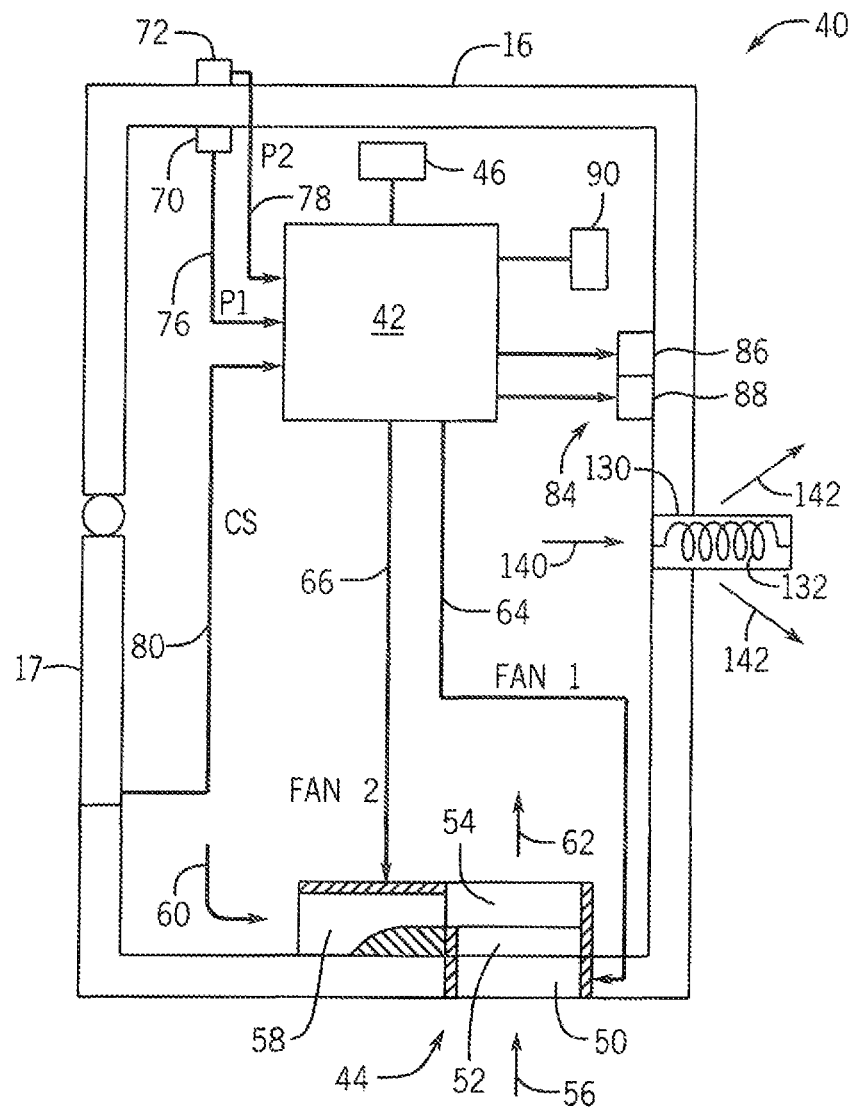
FIG. 3 is block diagram of the pressurization system of FIG. 2 in which the door or window of the operator cab is in a closed state.

However, as shown in FIG. 3, the door 17 of the operator cab 16 is in a closed state, thereby allowing pressure interior to the operator cab 16 to exceed ambient pressure exterior to the operator cab 16. Consequently, so long as pressure interior to the operator cab 16 exceeds the threshold, which is greater than ambient pressure, pressurization 140 in the operator cab 16 will open the pressure relief system 130 to release pressure 142 external to the operator cab 16 as shown. After the release of a sufficient amount of air via pressure 142, with pressure interior to the operator cab 16 falling below the threshold, the pressure relief system 130 will close, thereby cutting off any further release of pressure. Accordingly, the pressurization system 40, with the pressure relief system 130, can minimize pressure spikes and enable a more comfortable experience for the operator.

Figure 4:
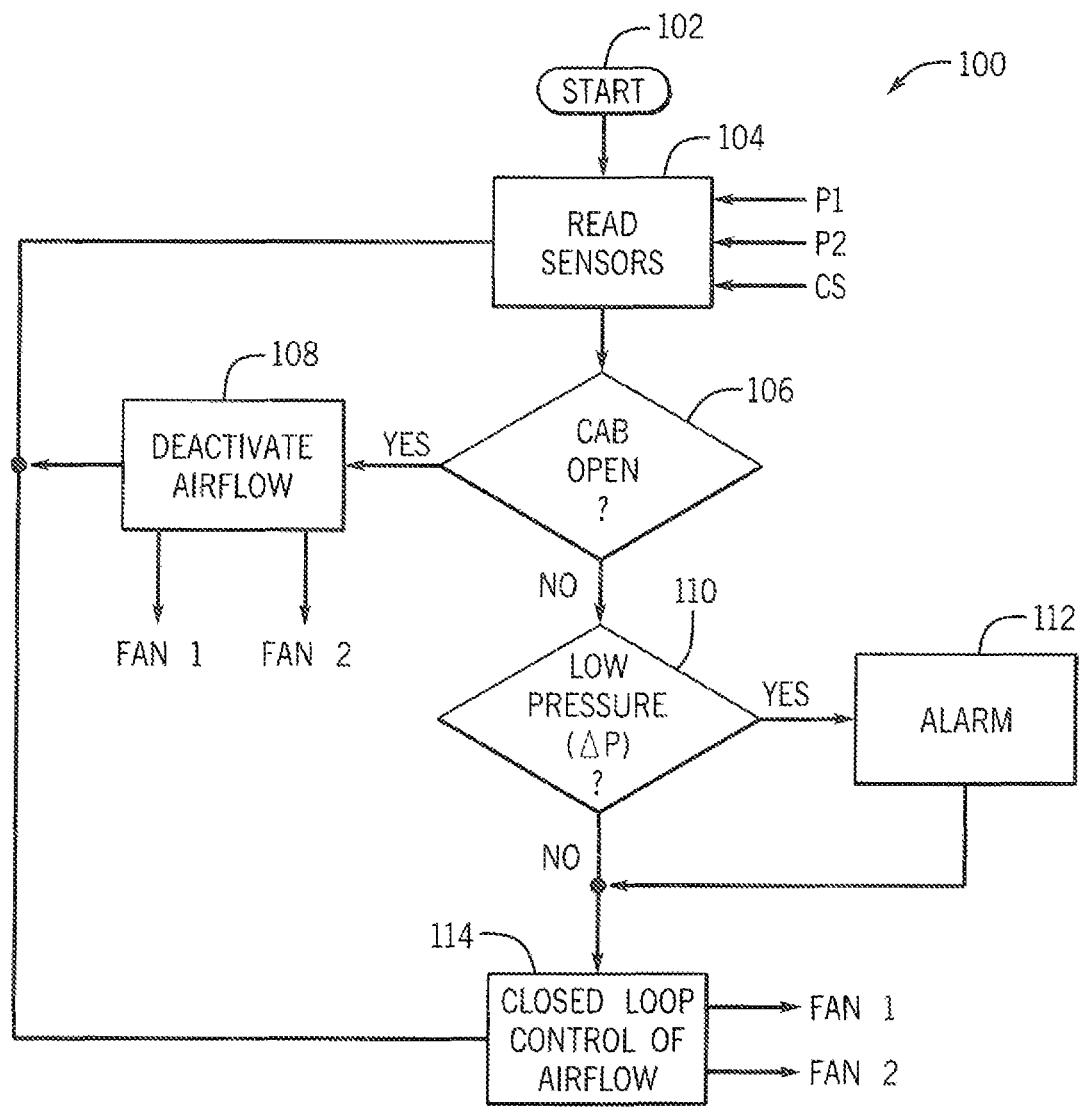
FIG. 4 is a flow diagram for the pressurization system of FIG. 2.

Referring now to FIG. 4, a flow diagram 100, which can be executed by the controller 42 in the pressurization system 40, is shown by way of example. In operation, following power-up/initialization at block 102, the controller 42 can read all sensors in the pressurization system 40, including the first and second pressure sensors 70 and 72, respectively, and the one or more cab sensors 74 at block 104. Next, at decision block 106, the controller 42 can determine an open or closed state of the operator cab 16 by analyzing the indicated state for each of the cab sensors 74. If any one of the cab sensors 74 indicates an open state (such as the door 17 being sensed in an open position), the controller 42 can default to an open state and proceed to block 108 to deactivate the airflow system 44. The controller 42 can deactivate the airflow system 44, for example, by deactivating the first and/or second fans 50 and 58, respectively, and then return to the block 104 to read the sensors. This first loop, between block 104, decision block 106, and block 108, can continue as long as the controller 42 determines the operator cab 16 to be in an open state.

However, at decision block 106, if the controller 42 determines the operator cab 16 to be in a closed state, which can occur when all cab sensors 74 indicate a closed state (such as the door 17 being sensed in a closed position), the controller 42 can exit the aforementioned first loop. Accordingly, the flow diagram 100 can proceed to decision block 110 in which the controller 42 can determine whether a low pressure condition exists in the operator cab 16. With additional reference to FIG. 5, in one aspect, to determine whether a low pressure condition exists in the operator cab 16, the controller 42 can determine a pressure differential (labelled "ΔP") by calculating a difference between the first and second pressures indicated by the first and second pressure signals 76 and 78, respectively. The pressure differential is positive when the first pressure (in the operator cab 16) is greater than the second pressure (external to the operator cab 16). The controller 42 can then compare the pressure differential to a predetermined activation threshold 120, which can be a positive minimum atmospheric pressure value. If the pressure differential is below the predetermined activation threshold 120, the flow diagram 100 can proceed to block 112 in which the controller 42 activates the alarm system 84, such as activation of a visual or audible indicator. Then, the flow diagram 100 can proceed to block 114 in which the controller 42 can execute a closed loop control of the airflow system 44 to achieve and maintain a set positive pressure in the operator cab 16, such as by activating the first and/or second fans 50 and 58, respectively, in a control loop to provide a positive set pressure differential in the operator cab 16. This can advantageously keep the system from overworking while providing operator comfort. However, if the pressure differential is already above the predetermined activation threshold 120, the controller 42 can bypass block 112 and proceed directly to block 114 to maintain the set positive pressure differential in the operator cab 16. The flow diagram 100 can continue to monitor the sensors while executing closed loop control of the airflow system 44. While the controller 42 determines the operator cab 16 to be in the closed state, the flow diagram 100 can continue in this second loop, between block 104, decision blocks 106 and 110, and block 114 (with optional block 112), with activation, variable speed and/or deactivation of the airflow system 44, such as via the fans, as needed to provide/maintain a positive set pressure differential in the operator cab 16.

Figure 5:
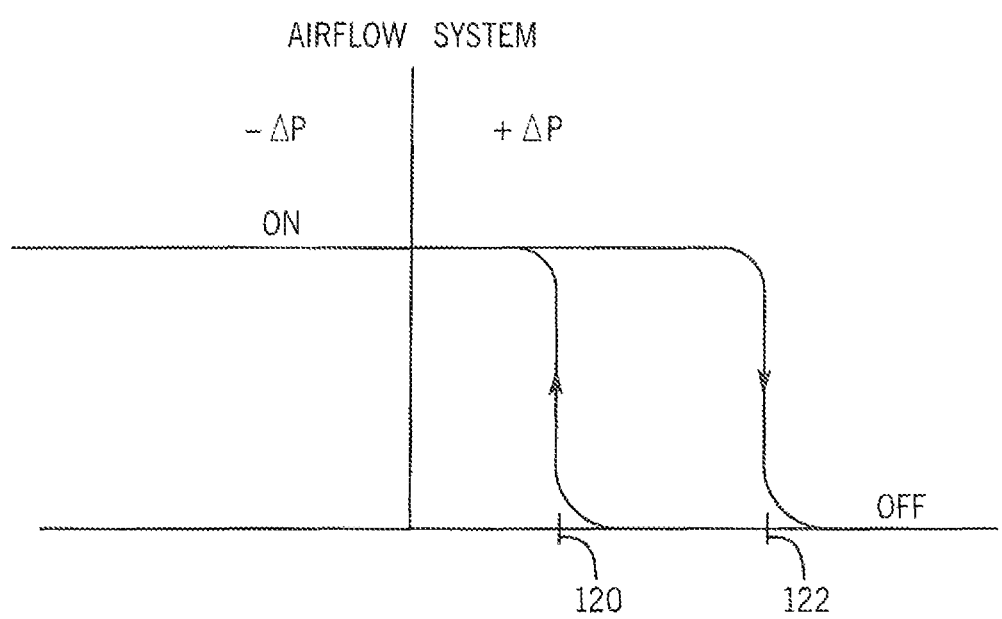
FIG. 5 is a state diagram for an airflow system of the pressurization system of FIG. 2.

In addition, the controller 42 can be configured to apply hysteresis before activating and/or deactivating the airflow system 44. For example, as shown in FIG. 5, although the predetermined activation threshold 120 can be used to determine when the airflow system 44 is activated ("ON"), once activated, a predetermined deactivation threshold 122, which can be a positive atmospheric pressure value that is greater than the positive minimum atmospheric pressure value, can be used to determine when the airflow system 44 is deactivated ("OFF") so as to avoid an excess positive pressure differential build up in the operator cab 16. In this way, minor pressure variations between the predetermined activation threshold 120 and the predetermined deactivation threshold 122 will not cause undesirable frequent changes with respect to the state of the airflow system 44.

Also, the controller 42 can be configured to monitor an elapsed time for activation of the airflow system 44, which can be an accumulation of periods of time in which the airflow system 44 is ON. In this way, performance characteristics, such as compressor hours, can be logged, and the controller 42 can electronically determine if the filter 52 should be replaced with a warning via the alarm system 84.

Figure 6A:
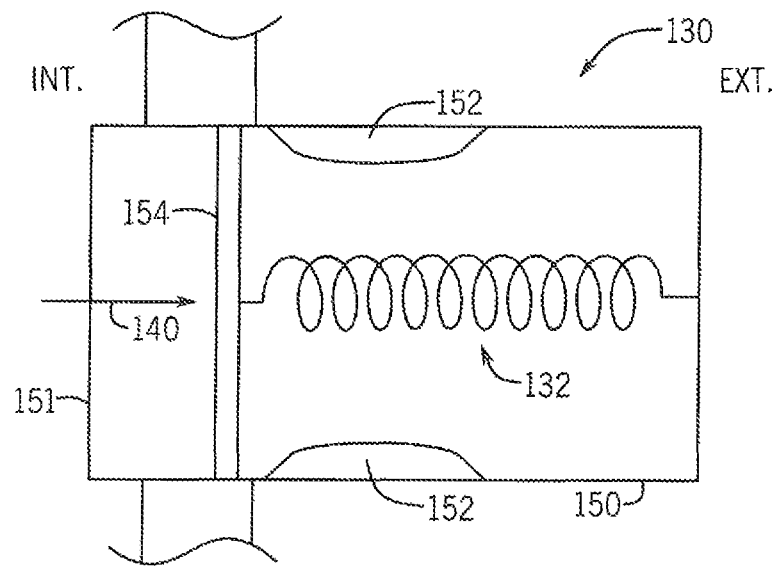
FIG. 6A is a pressure relief valve actuated by a spring according to a first aspect of the invention, shown in a position for maintaining pressure in the operator cab.
Figure 6B:
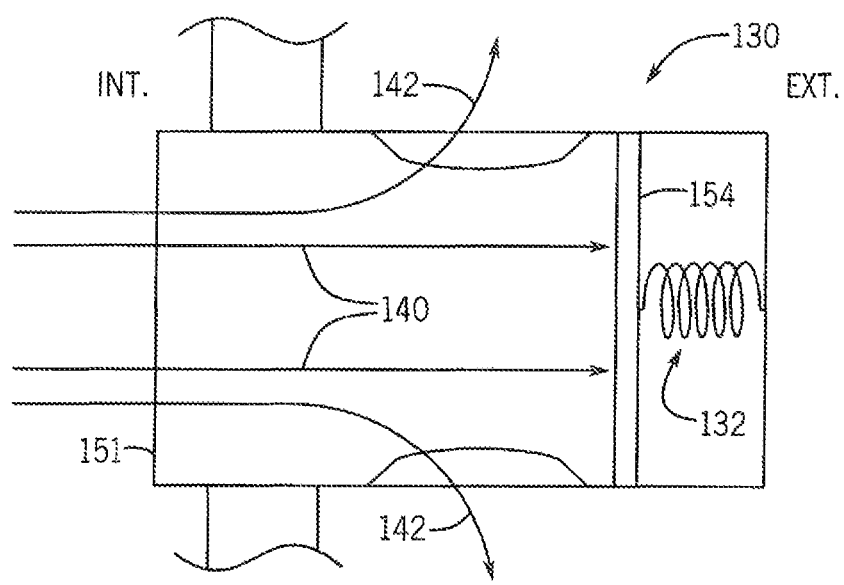
FIG. 6B is the pressure relief valve of FIG. 6A, shown in a position for releasing pressure from the operator cab.

Referring now to FIG. 6A, according to a first aspect of the invention, the pressure relief system 130 can include a pressure relief valve 150 arranged in the operator cab 16 such that an opening 151 of the pressure relief valve 150 is positioned interior ("INT.") to the operator cab 16 and one or more apertures 152 are positioned exterior ("EXT.") to the operator cab 16. A seal 154, internal to the pressure relief valve 150, can be connected to a spring 132 to actuate the pressure relief valve 150 between a closed condition, preventing release of pressure, as shown in FIG. 6A, and an open condition, allowing a release of pressure, as shown in FIG. 6B. In operation, when the pressurization 140 is less than a threshold set by a force of the spring, the spring 132 will keep the seal 154 in the closed condition, thereby preventing release of the pressure. However, when the pressurization 140 exceeds the threshold, the pressurization can overcome the force of the spring 132, pushing the seal 154 back and compressing the spring 132, to allow release of pressure 142 to the exterior of the cab 16 via the one or more apertures 152.

Figure 6C:
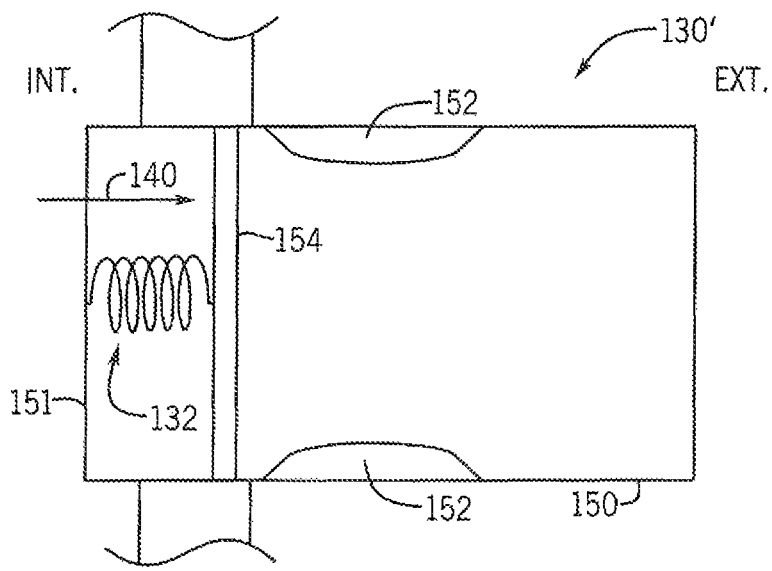
FIG. 6C is a pressure relief valve actuated by a spring according to a second aspect of the invention, shown in a position for maintaining pressure in the operator cab.
Figure 6D:
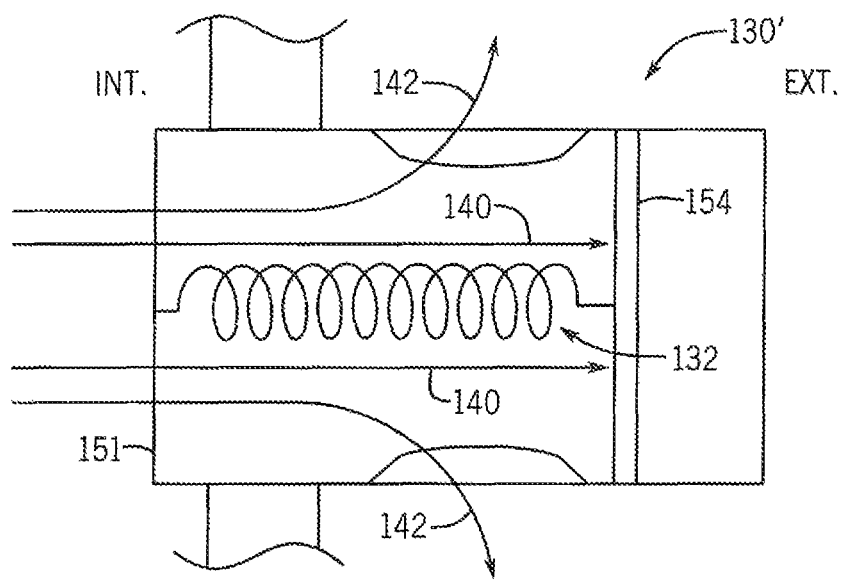
FIG. 6D is the pressure relief valve of FIG. 6C, shown in a position for releasing pressure from the operator cab.

Referring now to FIG. 6C, according to a second aspect of the invention, the pressure relief system 130' can again include a pressure relief valve 150 arranged in the operator cab 16 such that an opening 151 of the pressure relief valve 150 is positioned interior ("INT.") to the operator cab 16 and one or more apertures 152 are positioned exterior ("EXT.") to the operator cab 16. However, the spring 132 can be configured such that when the pressurization 140 is less than the threshold, the pressurization 140 cannot overcome the force of the spring 132, thereby keeping the seal 154 in the closed condition, as shown in FIG. 6C. When the pressurization 140 does exceed the threshold, the pressurization can overcome the force of the spring 132, pushing the seal 154 back and stretching the spring 132, to allow release of pressure 142 to the exterior of the cab 16 via the one or more apertures 152, as shown in FIG. 6D.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An agricultural sprayer comprising:
a chassis supported by a plurality of wheels, the chassis supporting an engine, a drive system, a lift arm assembly and an operator cab having a door or window;
a sprayer boom connected to the lift arm assembly;
an airflow system configured to draw ambient air into the operator cab to cause pressurization of the operator cab;
a pressure relief system arranged in the operator cab, the pressure relief system comprising a pressure relief valve actuated by a spring, wherein the pressure relief system is configured to release pressure from the operator cab when the pressurization of the operator cab exceeds a threshold;
a first pressure sensor configured to sense a first pressure in the operator cab;
a second pressure sensor configured to sense a second pressure external to the operator cab;
a cab sensor configured to sense an open or closed state of the door or window; and
a controller in communication with the airflow system, the first and second pressure sensors and the cab sensor, the controller executing a program stored in a non-transient medium operable to:
(a) determine a pressure differential by calculating a difference between the first and second pressures, wherein the pressure differential is positive when the first pressure is greater than the second pressure;
(b) activate the airflow system to provide a positive pressure differential when the cab sensor indicates the door or window is in the closed state; and
(c) deactivate the airflow system when the cab sensor indicates the door or window is in the open state.

2. The agricultural sprayer of claim 1, wherein the pressure relief system releases pressure external to the operator cab to cause a decrease in the pressurization of the operator cab, and wherein the threshold is at least 100 Pascals.

3. The agricultural sprayer of claim 1, wherein the controller activates the airflow system until a minimum positive pressure differential is achieved and then deactivates the airflow system.

\* \* \* \* \*